(12) United States Patent
Matsubara

(10) Patent No.: US 6,844,017 B1
(45) Date of Patent: Jan. 18, 2005

(54) FOOD PROCESSING METHOD FOR EDIBLE AND PERISHABLE PLANTS

(75) Inventor: Mamoru Matsubara, Kanagawa (JP)

(73) Assignee: GF Gijyutsu Kaihatsu Co. Ltd., Yokohama (JP)

( * ) Notice: Subject to any disclaimer, the term of this patent is extended or adjusted under 35 U.S.C. 154(b) by 134 days.

(21) Appl. No.: 10/110,414

(22) PCT Filed: Sep. 22, 2000

(86) PCT No.: PCT/JP00/06520

§ 371 (c)(1),
(2), (4) Date: Jul. 19, 2002

(87) PCT Pub. No.: WO01/26476

PCT Pub. Date: Apr. 19, 2001

(30) Foreign Application Priority Data

Oct. 12, 1999 (JP) ............................................ 11/290134

(51) Int. Cl.⁷ ............................ A23B 7/06; A23L 1/218
(52) U.S. Cl. ........................ 426/331; 426/521; 426/508
(58) Field of Search .......................... 426/61, 102, 327, 426/331, 615, 438, 441, 520, 524, 508, 509, 521

(56) References Cited

U.S. PATENT DOCUMENTS

| | | | | |
|---|---|---|---|---|
| 4,521,439 A | * | 6/1985 | Bengtsson et al. | 426/500 |
| 4,557,937 A | * | 12/1985 | Bournier | 426/241 |
| 4,647,462 A | * | 3/1987 | Gogins et al. | 426/270 |
| 5,607,712 A | * | 3/1997 | Bourne | 426/321 |
| 5,972,397 A | * | 10/1999 | Durance et al. | 426/242 |
| 5,997,938 A | * | 12/1999 | Taylor et al. | 426/637 |
| 6,004,601 A | * | 12/1999 | Donato et al. | 426/270 |
| 6,110,518 A | * | 8/2000 | Cooper et al. | 426/385 |
| 6,548,093 B1 | * | 4/2003 | Collinge et al. | 426/302 |

FOREIGN PATENT DOCUMENTS

| | | | | |
|---|---|---|---|---|
| JP | 60-237957 | | 11/1985 | |
| JP | 06-169 690 | * | 6/1994 | ............ A23B/7/10 |
| JP | 8-140570 | | 6/1996 | |
| WO | 92/10946 | | 7/1992 | |

* cited by examiner

Primary Examiner—Keith Hendricks
(74) Attorney, Agent, or Firm—Harness, Dickey & Pierce, P.L.C.

(57) ABSTRACT

The present invention makes it possible to kill both the cells and the microorganisms of edible and perishable plants and at the same time to cause the cellular resolution by autolytic enzymes, and to change undesirable characteristics for foods such as harshness, bitterness, astringency, grassiness and the like into desirable characteristics such as tastiness, sweetness, and flavors.

4 Claims, 3 Drawing Sheets

FOOD PROCESSING METHOD FOR EDIBLE AND PERISHABLE PLANTS

TECHNICAL FIELD OF THE INVENTION

The present invention relates to a food processing method for edible and perishable plants such as vegetables and fruits.

BACKGROUND ART

Foods such as vegetables and fruits are largely divided into non-heated foods (raw foods) and heated foods. Very few in between these two states are produced. Non-heated foods are further divided into ones whose cells are alive (edible) and perishable plants such as salad and fresh fruit) and the others whose cells are dead (pickles, that is tsukemono, and vinegar pickles). Some foods have toxicity, bitterness, astringency, harshness, grassiness and the like to protect themselves against animals, insects and the like, under the condition that their cells are alive. On the other hand, when their cells die, edible plants are swiftly resolved by autolytic enzymes and so become easy to eat and digest.

Numerous microorganisms are attached to a surface of edible and perishable plants. Usually, even after being washed, the plants retain microorganisms in which the number of bacteria is between $10^4$ and $10^6$ per gram. As there have frequently occurred food-poisoning in recent years, the foods are commonly washed in a germicidal agent such as sodium hypochlorite solution. But a complete sterilization is difficult, and rinsing the foods after the above treatment to remove the germicidal agent largely decreases their quality. As a result, many schools have given up providing their pupils with raw vegetables (salad) for lunch.

On the other hand, in the case of pickles and vinegar pickles of a non-heated type and whose cells are dead, a method is adopted in which microorganisms are controlled from reproducing while their cells are being killed by an osmotic pressure of salt, sterilizing power of vinegar and the like. In this case, however, the low temperature and the salt restrain the resolution of the cells by autolytic enzymes, so that it takes a long processing time, which makes the pickles and the vinegar pickles much too salty and sour. Pickles using highly concentrated salt to preserve them from rotting should be exposed to water so as to remove the salt. Accordingly the tastiness factor and nutritive elements are greatly damaged, and the real situation is that the use of additives helps the pickles stay tasty for longer days. Furthermore, as a substantial amount of water is used (usually 50 tons of water is used to make one ton of pickles), waste water disposal becomes very costly.

In the case of heating edible plants, their tissue softens, and the factors such as harshness, grassiness and the like disappear. But the rapid heating makes the cellular resolution by autolytic enzymes insufficient, the foods lose their original taste, and nutritive elements (especially Vitamin C) are greatly damaged.

The technologies of processing edible and perishable plants by heating at a medium temperature include a method of processing vegetables in a warm aqueous solution of a medium temperature range (between 40° C. and 70° C.) (Japanese Patent Laid-open Publication No. 5-68505), one of making pickles by steaming them (Japanese Patent Laid-open Publication No. 6-169690), one of sterilizing and preparing foods by steaming them (Japanese Patent Laid-open Publication No. 11-155513), one of pickling Japanese apricots with salt while maintaining a high atmospheric temperature (Japanese Patent Laid-open Publication No. 9-65824), one of making pickles in a highly concentrated saline solution of a medium temperature (Japanese Patent Laid-open Publication No. 8-289722), one of washing vegetables in a warm aqueous solution of between 35° C. and 55° C. (Japanese Patent Laid-open Publication No. 11-18740), and so on. These methods, however, do not fix the temperature range from the viewpoint of cellular resolution by autolytic enzymes, so that the foods have neither tastiness nor sweetness.

Since edible and perishable plants are alive, nutritive substances of the tissue are lost by metabolism as time passes, so that the plants wither, become fibrous and less tasty. In due time, they develop mold from the parts where the cells died from such as cuts, and rot all over. Perishable vegetables keep only for a week or so at the longest. Perishable fruits keep longer than vegetables but about one month is the limit.

Generally, perishable plant foods have hard cell walls, lack flexibility and contain a lot of water (80–95% of them is water) as compared with animal foods. Therefore, their cells are greatly destroyed by freezing and a large amount of exudate, i.e. "drip", flows out when defrosting. In addition, browning, softening and rotting are caused by enzymes. Accordingly, it is said that perishable plant foods are not suitable for freezing.

On the other hand, frozen processed vegetables and fruits are commercially available. In this case, vegetables and fruits are cut into small pieces and blanched, that is to say, dipped into hot salt water of a high temperature for a short time (for example, 90° C.×10 seconds–1 minute) by way of treatment before freezing. This heating treatment softens the tissue, deactivates the enzymes and fixes chlorophyll, which prevents the products from becoming low in quality while they are kept frozen as well as when they are defrosted.

Since blanching means cooking by heating, it is inevitable that both texture and nutritive substances of perishable foods are lost. Furthermore, the shortness of heating time makes the equal-treatment difficult, resulting in variation in quality. On top of it, without cellular resolution by autolytic enzymes, harshness and grassiness remain, and the original taste of the foods is lost.

Since non-heated processed foods, for example, pickles, whose cells are dead, have been dehydrated with salt, and the cell walls have been destroyed, the foods are hardly damaged by freezing. It has already come into practice to store heavily salted pickles such as nozawana and takana, whose tissues are comparatively solid, in a freezer.

The cells of edible and perishable plants are alive. If the plants are left as they are, they show signs of nutritive deterioration and change in taste, which decreases their commercial value. Considering the above, edible and perishable plants should be cooked as soon as possible or stored in a freezer. When the cells die, the plants begin to be resolved by autolytic enzymes, but at the same time they are attacked by the microorganisms attached to them and rotting progresses.

An object of the present invention is to offer a food processing method for edible and perishable plants, which kills both the cells and the microorganisms of them, as well as causes the cellular resolution by autolytic enzymes, and accordingly changes undesirable components for foods (harshness, bitterness, astringency, grassiness and the like) into tastiness, sweetness, sourness and flavors.

A further object of the present invention is to offer a food processing method for edible and perishable plants which is excellent for storing them in a freezer, in addition to the above advantages.

SUMMARY OF THE INVENTION

In order to accomplish the above and other objects, the present invention provides the following food processing method for edible and perishable plants. An aqueous solution with a higher osmotic pressure than that of targeted edible and perishable plants is prepared and heated, retaining a certain range of temperatures which practically kills cellular tissues of the above edible plants and microorganisms attached thereto, but does not substantially discourage the autolytic enzymes both inside and outside the cells of the above edible plants, this heated aqueous solution is brought into contact with the above targeted edible plants, thereby killing most of the cells of the above edible plants, causing cellular resolution by autolytic enzymes, and also conducting low-temperature sterilization treatment, thereafter the above edible plants are processed into foods.

Moreover, in a food processing method for edible and perishable plants of the present invention, the above heated aqueous solution is brought into contact with the targeted edible plants, thereby killing most of the cells of the above edible plants, causing cellular resolution by autolytic enzymes and also conducting low-temperature sterilization treatment, thereafter the above edible plants are brought into contact with a cooling solution and are processed into foods after having been cooled and stored in a freezer.

It is preferable that the above heated aqueous solution has an osmotic pressure of 10 atm or higher, and a temperature higher than 55° C. but lower than 60° C.

As the osmotic pressure of almost all edible and perishable plants is lower than 10 atm, the osmotic pressure of the aqueous solution must be 10 atm or higher. If the latter osmotic pressure is lower than 10 atm, the targeted plants absorb water, which destroys the flavor, and become difficult to handle after the treatment. In order to attain this osmotic pressure, the aqueous solutions of foods or food additives with a high osmotic pressure are preferable. For example, inorganic salts such as salt and calcium chloride, edible saccharides such as sucrose and glucose, organic acids or related salts such as acidulants, fermented vinegar and fruit vinegar, and alcoholic drinks may be used.

Here are examples of the substances with an osmotic pressure of 10 atm as compared with the concentration of aqueous solutions: salt 1.2% of weight, sucrose (disaccharide) 12% of weight, glucose (monosaccharide) 6% of weight and ethyl alcohol 1.3% of weight. These substances may be used alone or as a mixture of two or more thereof. The osmotic pressure can be easily calculated because in general it is inversely proportional to the molecular weight of a substance and proportional to its concentration.

It is desirable that edible and perishable plants are in contact with an aqueous solution having an osmotic pressure of 10 atm or higher and a temperature between 55° C. and 60° C., so that most of the cells, that is 50% or more, or preferably 60% or more, are killed. In this range of temperatures, low and medium temperature bacteria which are the major source of food poisoning and putrefaction will be mostly (95% or more) killed. Although the control time depends upon the shapes, sizes and physical properties of the plants, it is generally in the range of 1 to 30 minutes.

The most effective way to resolve the compounds inside and outside the cells and make them homogeneous is to utilize the autolytic enzyme effect which causes the destruction of the cell walls and cuts up big molecules such as polyphenol, cellulose, polysaccharides, proteins and the like.

For this purpose, it is indispensable to keep a temperature of 60° C. or lower at which the enzymes are not deactivated. That is to say, by undergoing a process in which the temperature is kept between 55 to 60° C. at which the cells die but the enzymes are not deactivated, the processability and preservative quality thereafter will be greatly improved.

The above-mentioned treatment with a warm aqueous solution at a temperature of 55 to 60° C. is suitable for foods, because in this treatment, nutritive elements such as vitamin C, which are easily destroyed by heat, are not damaged, chlorophyll is fixed, the color will fade more slowly, and microorganisms largely decrease in number.

In addition, preferably the above cooling solution has an osmotic pressure of 5 atm or higher, and a temperature of 15° C. or lower.

It is advisable that a process in which the above edible and perishable plants are brought into contact with the above heated aqueous solution and/or with the above cooling solution, is conducted by soaking the above edible and perishable plants in the above heated aqueous solution and/or in the above cooling solution, or by spraying the above heated aqueous solution and/or the above cooling solution on the above edible and perishable plants.

BEST MODE FOR CARRYING OUT THE INVENTION

Figure 1:
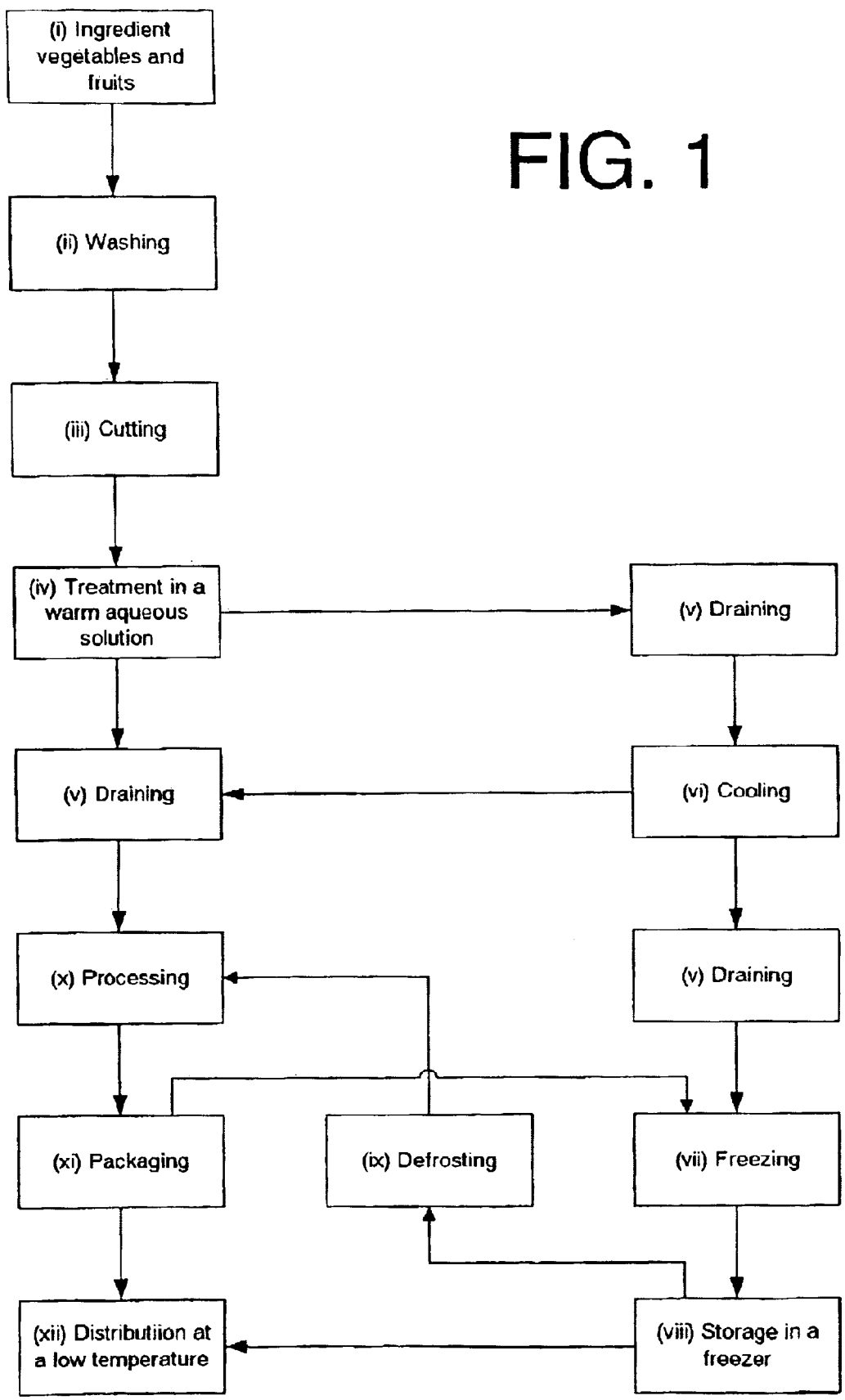
FIG. 1 is a flowchart showing a food treatment process of edible and perishable plants of the present invention.

[A] The implementation of the present invention will now be described in detail based on FIG. 1 showing the treatment process of edible and perishable plants.

(1) Targeted Vegetables and Fruits

The targets are perishable vegetables, such as green vegetables (spinach, mustard spinach, Chinese cabbage, cabbage, and the like), stalk vegetables (asparagus, broccoli, cauliflower, onion, and the like), fruit vegetables (cucumber, tomato, melon, strawberry, and the like), root vegetables (turnip, carrot, Japanese radish, scallion (rakkyo), ginger, sweet potato, potato, taro, yam, and the like) and various mushrooms (hen-of-the woods fungus, oyster mushroom, shimeji, shiitake, mushroom, and the like) as well as perishable fruits (Japanese apricot, apricot, apple, cherry, peach, pear, and the like).

(2) Washing

Agricultural products must be washed because microorganisms and foreign substances in the soil are attached to them. In order to wash and remove various foreign substances such as soil, sand, dead leaves, roots, insects and their larvae, slugs, snails, frogs, hair and the like, it is efficient for the targets to be soaked in a rinse tank, or to be sprayed with wash water. Using surface active agents or germicides together with the above washing is also effective.

(3) Cutting into Suitable-Sized Pieces

As the targeted plants have different shapes, sizes and physical properties, it is necessary to adjust their shapes and sizes in order to heat them equally and evenly. Cubic, cylindrical or globular shapes of 50 mm or under in thickness or in diameter are desirable. For example, a Japanese radish is cut lengthwise in half or in four, or cut in round slices of 50 mm or less in thickness. Cucumbers, Japanese apricots, strawberries and the like are used whole. Green vegetables, stalk vegetables or various mushrooms can be used whole, or cut in half or four.

(4) Treatment in a Warm Aqueous Solution

The targets are brought into contact with a 55° C. to 60° C. aqueous solution to kill the cells and cause the resolution of them by autolytic enzymes. At this time, the osmotic pressure of the aqueous solution must be 10 atm or higher (in the case of salt, 1.2% of weight or more), so as to prevent the targets from absorbing water.

The contact time must be decided based on the heat transfer velocity (specific surface area, density, thermal conductivity) and the sizes (thickness in particular) of the targets. The suitable time examples required for each vegetable are as follows:

25–30 minutes for Japanese radish (cut lengthwise in four), 15–20 minutes for cucumbers (whole), 8–12 minutes for scallions/asparagus (whole)/Chinese cabbage (cut into pieces), 5–7 minutes for various mushrooms, 2–5 minutes for spinach/mustard spinach, 10–15 minutes for Japanese apricots/strawberries.

Ideally, the weight of an aqueous solution required for heating is 2 to 30 times, preferably 3 to 20 times that of the targets. Using the same solution several times makes the treatment more efficient.

The products become more flexible after they are treated, so that the shapes may be changed. Green vegetables become easy to handle thereafter because the volume decreases considerably. This treatment loses no nutritive substances, and moreover, drastically decreases (to one hundredth or so) the number of microorganisms.

(5) Solution Removal

The solution attached to the products is removed by fall due to gravity, by use of centrifugal separators, by blowing clean air thereon, or by wiping with such as paper or cloth.

(6) Cooling

The heated targets must be cooled except those to be processed immediately, in order to maintain their quality. The concentration of a cooling solution may be lower than that of a warm aqueous solution because the surfaces of the targets have been already heated, their cells are dead and an aqueous solution with a high osmotic pressure has penetrated into them. For practical use, a cooling solution with an osmotic pressure of 5 atm or higher (in the case of salt 0.6% by weight or more) and a temperature retained at 15° C. or lower is desirable.

(7) Freezing

IQF (Individual Quick Freezing) method using various freezers such as tunnel freezers of air blast type or liquid nitrogen type, contact freezers makes it easy to handle the products after they are frozen.

(8) Storage in a Freezer

The products must be kept in a −20° C. class freezer. Glazing or airtight packing is effective for preventing the products from becoming dry while they are kept in a freezer.

(9) Defrosting

Although the products can be defrosted while they are left as they are, it is more efficient to use a warm saline solution defrosting machine (Japanese Patent Laid-open Publication No. 9-215468).

(10) Preparation and Processing

By using normal cooking methods, ingredients of salads, foods preserved in salt (lightly pickled vegetables, pickles, seasoned pickles, and the like), seasoned dishes (soused greens, cooked salads, and the like), fermented foods/pickled foods in vinegar (kimchi, sauer kraut, pickles, marinade, and the like), foods processed with sugar (jam, fruit wine, candied fruit, and the like) and heated foods (simmered food, steamed food, grilled food, deep fried food, lightly-fried food, and the like), as well as frozen foods which are intermediate ingredients, are prepared and processed.

(11) Packaging

The products are packed airtight in a container or a bag, both made of either paper or plastic. If necessary, deaeration packaging, gas packaging and the like can be used.

(12) Distribution at Low Temperature

As the aim of the present invention is to provide food products using no germicides and also limiting preservatives and food additives as much as possible, product distribution under cold or frozen conditions is essential.

Figure 2:
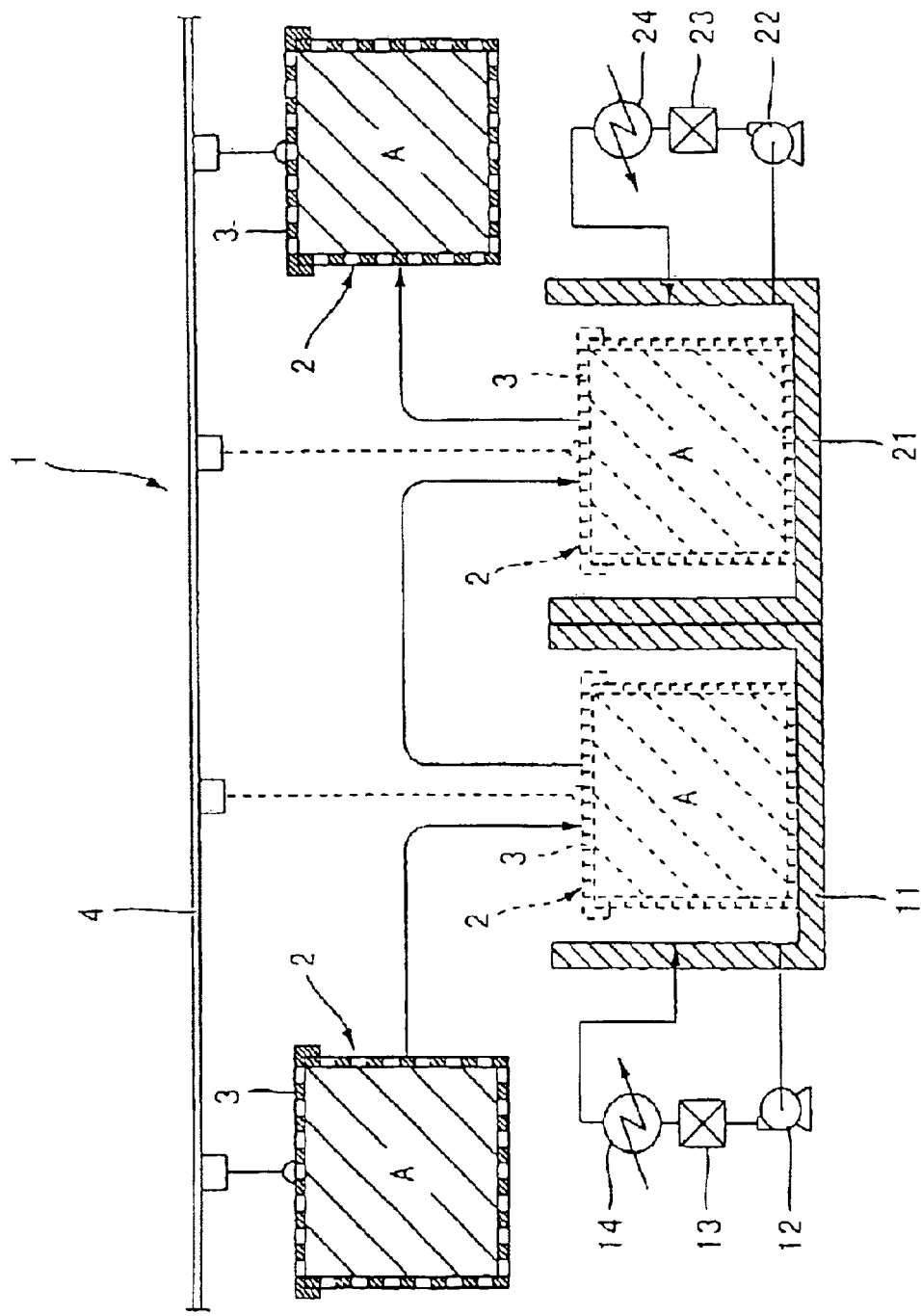
FIG. 2 is a diagram briefly showing a batch-type treatment equipment to be used when implementing a method of the present invention.
Figure 3:
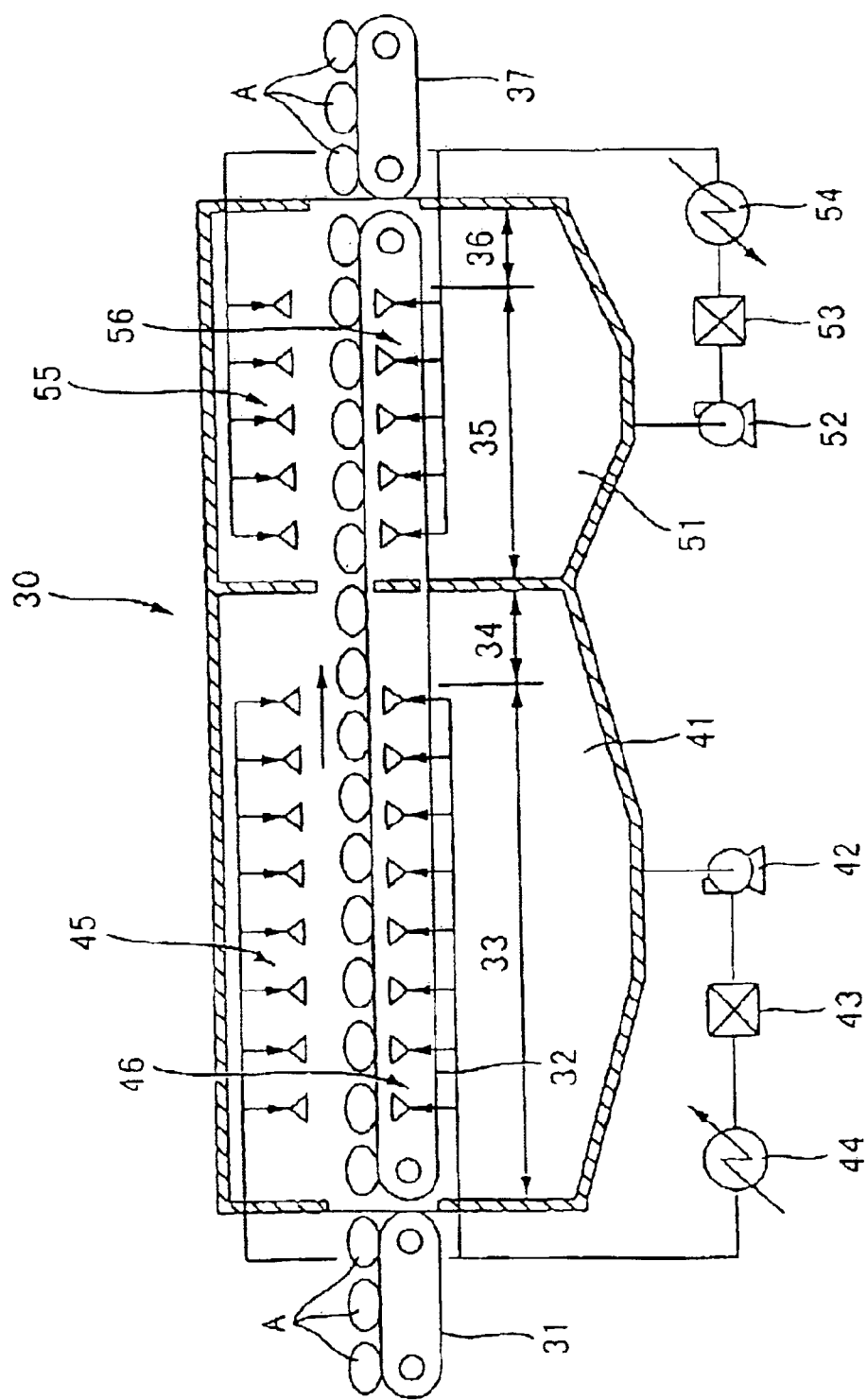
FIG. 3 is a diagram briefly showing a sequence-type treatment equipment to be used when implementing the method of the present invention.

[B] Equipment examples of the present invention are explained in FIGS. 2 and 3.

Batch-Type Treatment Equipment (FIG. 2)

A targeted edible and perishable plant "A" having been cut into suitable-sized pieces (50 mm or less in thickness) and washed, is processed by a batch-type treatment equipment "1".

A basket "2" is made of a net and/or a perforated plate material, into and out of which an aqueous solution goes freely but the target "A" is unable to flow out. To prevent the target "A" from surfacing, the basket is equipped with a removable lid "3" on its top.

The ceiling is equipped with a traversing rail "4" with a hoist, which enables the basket "2" to run up and down, and also from side to side. This can be done either manually or mechanically.

A heating tank "11" is a tank that holds a heated aqueous solution and is large enough to include the entire basket "2".

A circulation pump "12" is used to circulate an aqueous solution in the heating tank. The solution is passed through a filter "13" to remove foreign matters, is moved into a heater "14" to control its temperature to a required range of degrees, then is put back into the heating tank "11" so that the solution may be kept at an even temperature in it.

The target "A" which has been heated for a required time is lifted together with the basket "2", and the solution having been drained, is transferred to a cooling tank "21". The cooling tank "21" is preferably similar to the heating tank "11", and a cooling solution is circulated in a circulation pump "22".

The cooling solution is filtered by a filter "23", moved into a cooler "24" to control its temperature, and put back into the cooling tank 21 so that the solution may be kept at an even temperature in it.

The target "A" which has been cooled for a required time is lifted, is taken out from the basket after the solution is drained, then moves on to a subsequent process.

The above-mentioned treatment may be automatically conducted by sequence control, which helps save labor. In addition to that, it is possible to even the temperature as well as to shorten the required treatment time by shaking the target "A" mechanically or by applying a supersonic wave to the solution and shaking it.

Sequence-Type Treatment Equipment (FIG. 3)

A targeted edible and perishable plant "A" having been cut into suitable sized pieces (50 mm or less in thickness)

and washed, is put into a sequence-type treatment equipment "30" and then is placed on a main conveyor "32" via a conveyor "31".

The main conveyor "32" is connected to a discharge conveyor "37" through a heating part "33", a solution-draining part "34", a cooling part "35" and the other solution-draining part "36". The target "A", going through the above line, is carried from the discharge conveyor "37" to a subsequent process.

The main conveyor "32" is an endless type one with driving parts at both ends, and is made of porous material (net, perforated plate material or the like) and moves the target "A" continuously.

A heating tank "41" is designed in such a way that the solution stays at its bottom. The solution is carried by a circulation pump "42", passed through filter "43" to remove foreign matters, moved to a heater "44" to control its temperature to a required range of degrees, and then sprayed by both upper and lower sprays "45" and "46" to heat the target "A". The volume of the circulated solution is desirably between 10 and 20 times that of the target to be treated.

The heated target "A" is carried to the cooling part "35" via the solution-draining part "34".

A cooling tank "51" is designed in such a way that the solution stays at its bottom. The solution is carried by a circulation pump "52", passed through a filter "53" to remove foreign matters, moved to a cooler "54" to control its temperature, and then sprayed by both upper and lower sprays "55" and "56" to cool the target "A".

It is also effective that the solution draining parts "34" and "36" are equipped with solution-draining measures such as spraying clean air on the target so that the solution should not be brought out from both parts (not described in this figure).

The time required for the target to be contacted with the solution can be selected freely depending on the velocity of the main conveyor "32". The cooling time required should be between 50 and 100% to the warming time. The length ratio of the heating part "33" and the cooling part "35" of the conveyor is preferably the same as the above ratio of the time.

In this sequence-type treatment equipment "30", it is possible to mobilize the target "A" by controlling pressure, solution flow quantity, and angles of upper and lower sprays "45", "46", "55" and "56", so that products of even quality can be produced quickly. Furthermore it is easy to make the system completely airtight and it is also rather easy to add an automatic washing function, both of which are effective at preventing the target from being polluted with microorganisms.

The above-mentioned equipment shows only one example to implement the method of the present invention, and the equipment applicable to the present invention is not to be limited to the above example.

EXAMPLE 1

As Sample 1A, 5 whole cucumbers (approximately 500 g) were immersed in 4 liters of a 14% by weight saline solution kept between 56–59° C., left to soak for 20 minutes, then transferred and soaked in a 2% by weight cold saline solution (0–5° C.) for 20 minutes to cool them. The same kind and number of non-treated whole cucumbers in the same lot was used as Sample 1B. The number of living bacteria, quantity of vitamin C, and salt content for samples 1A and 1B were analyzed at Japan Food Research Laboratories. The results are as follows:

TABLE 1

The analysis of the cucumbers

| | | Methods of analysis |
|---|---|---|
| (Sample 1A) | | |
| The number of living bacteria | 300 or less/g | Standard agar plating method |
| Vitamin C | 9 mg/100 g | High performance liquid chromatography |
| Salt | 836 mg/100 g | Atomic absorption spectrometry |
| (Sample 1B) | | |
| The number of living bacteria | $5.7 \times 10^4$/g | Standard agar plating method |
| Vitamin C | 9 mg/100 g | High performance liquid chromatography |
| Salt | 5 mg/100 g | Atomic absorption spectrometry |

(Evaluation)

There occurred neither change of weight nor loss of nutritive substances by treatment in a warm aqueous solution, the number of living bacteria greatly decreased, and the salt content was low. Sample 1A was edible raw and tasted like lightly salted pickles or salad.

EXAMPLE 2

The cucumbers in samples 1A and 1B of Example 1 were cut into pieces about 5 cm long, pickled in the following way, and compared.

TABLE 2

Ingredients for making cucumber pickles

| | |
|---|---|
| cucumbers (pieces 5 cm long) | 500 g |
| 10% acid vinegar | 200 cc |
| water | 500 g |
| sugar | 200 g |
| glucose | 200 g |

(Evaluation)

After having been kept in a refrigerator for 2 weeks, Sample 1A (the present invention) was still deep green and tasted good, but Sample 1B (non-treated) browned, went bad and was not good to eat.

EXAMPLE 3

As Sample 2A, 700 g of a half Chinese cabbage (lengthwise cut) was cut into pieces 5 cm wide, placed in a net bag and soaked in 4 liters of a 14% by weight saline solution kept between 56–59° C. for 12 minutes, then transferred and soaked in a 2% by weight cold saline solution (0–5° C., 4 liters) for 12 minutes to cool them. The other half Chinese cabbage (non-treated) was used as Sample 2B for comparison. The number of living bacteria, quantity of vitamin C and salt content for samples 2A and 2B were analyzed by Japan Food Research Laboratories.

The results are as follows:

TABLE 3

The analysis of the Chinese cabbage (cut)

| | | Methods of analysis |
|---|---|---|
| (Sample 2A) | | |
| The number of living bacteria | 5.6 × 10³/g | Standard agar plating method |
| Vitamin C | 13 mg/100 g | High performance liquid chromatography |
| Salt | 1150 mg/100 g | Atomic absorption spectrometry |
| (Sample 2B) | | |
| The number of living bacteria | 2.1 × 10⁵/g | Standard agar plating method |
| Vitamin C | 13 mg/100 g | High performance liquid chromatography |
| Salt | 12 mg/100 g | Atomic absorption spectrometry |

(Evaluation)

There occurred neither change of weight nor loss of nutritive substances by treatment in a warm aqueous solution, the number of aerobic bacteria greatly decreased, and the salt content was low. Sample 2A was edible raw and tasted like lightly salted pickles or salad.

EXAMPLE 4

The two halves of Chinese cabbage, 500 g each in samples 2A and 2B were dressed with kimchi seasoning shown in Table 4, and kept in a refrigerator for 3 days.

TABLE 4 kimchi seasoning

| ground chili pepper | 5 g |
|---|---|
| salt-cured preserve of squid | 10 g |
| garlic | 1 piece |
| ginger | 5 g |
| sugar | 10 g |

(Evaluation)

After having been kept in a refrigerator for 3 days, Sample 2A (the present invention) was well pickled, with a Kimchi flavor and tasted good, but Sample 2B (non-treated) was raw Chinese cabbage with no kimchi flavor.

EXAMPLE 5

300 g of fully ripened Nanko-ume (the most representative and high quality Japanese apricot) was placed in a net bag and soaked in 4 liters of a 15% by weight saline solution kept between 55.5–58.5° C. for 15 minutes to treat them in a warm aqueous solution. These treated Japanese apricots, after having been slightly drained, were placed in a one-liter glass bottle, 150 g of sugar and 500 cc of white liqueur (alcohol 35%, cooled to 2° C.) were added, and the bottle was left as it was at room temperature for 4 weeks and stirred occasionally.

The Japanese apricots completely sank to the bottom in 4 weeks, and light-colored transparent Umeshu (ume brandy) was obtained.

The evaluation was that there was no great difference in flavor between this and the one obtained from non-treated Japanese apricots which were processed and soaked for 8 months in the same way as the above. (An evaluation made by all 5 panelists.)

EXAMPLE 6

As Sample 3A, 500 g of shaped scallions were placed in a net bag and was soaked in 4 liters of a 12% by weight sugar and 3% by weight saline solution kept between 55.5–58.5° C. for 8 minutes, then soaked in 4 liters of a 1% by weight cold saline solution kept between 5–10° C. for 6 minutes to cool it.

On the other hand, as Sample 3B, the same kind and volume of scallions in one lot was dipped in a 3% by weight hot saline solution (90° C.) for 30 seconds for blanching, then dipped in a cold aqueous solution kept between 0–2° C. for 2 minutes.

Each of samples 3A and 3B, after the solution was wiped off, was placed side by side on an aluminum tray, frozen in a direct-freezing type freezer (Toshiba Corporation, GR-274SV) for one hour, then moved into a plastic vessel, and kept in a −20° C. freezer for one month.

Liquid seasoning shown in Table 5 was poured on samples 3A and 3B which were kept in a frozen condition, then the samples were kept in a refrigerator for one month.

The evaluation was that the scallions of the present invention were white, lustrous, and crisp with a sharp taste and strong flavor, as compared with the blanched ones. (An evaluation made by all 5 panelists.)

TABLE 5

Composition of liquid seasoning

| corn vinegar (4.2%) | 400 cc |
|---|---|
| water | 320 cc |
| sugar | 200 g |
| salt | 40 g |

EXAMPLE 7

A bundle of spinach (200 g) was soaked in 4 liters of a 3% by weight saline solution kept between 55.5–58.5° C. for 2 minutes, then soaked in a 1% by weight cold saline solution (10–15° C., 4 liters) for one minute, lightly squeezed to drain, and was cut to a length of 4 cm. The pieces were then placed vertically on an aluminum tray, frozen in a direct-type freezer for 2 hours, put into a bag of barrier plastic, and kept in a −20° C. freezer for 3 months.

The evaluation after defrosting was as follows:
① bright green color, ② little dripping, ③ the tissue being solid and chewy, ④ texture close to raw compared with commercially available, blanched frozen products.

EXAMPLE 8

300 g of maitake mushroom (whole) was soaked in 4 liters of a 1.5% by weight saline solution kept between 55.5–58.5° C. for 3 minutes, then immediately transferred and soaked in a 1% by weight cold saline solution (10–15° C., 4 liters) for 2 minutes to cool it, left as it was for 3 minutes to drain solution. Then it was placed on an aluminum tray, frozen in a direct-type freezer-refrigerator for 2 hours, put into a bag or barrier plastic, and kept in a −20° C. freezer for one month. For comparison, non-treated maitake mushroom was frozen and kept in a freezer in the same way.

The evaluation after defrosting shows that the products of the present invention had the following characteristics compared with the non-treated ones.
① little dripping, ② deep brown color, ③ little harshness, ④ the tissue is solid.

EXAMPLE 9

300 g of Nyohou brand strawberries of medium size were soaked in 4 liters of a 6% by weight fructose solution kept between 55.5–58.5° C. for 12 minutes, then cooled in a 3% by weight fructose solution (10–15° C., 2 liters) for 8 minutes, left as is on a wire gauze for 3 minutes to drain the solution. After the solution was drained, the strawberries were placed on an aluminum tray, frozen in a direct-type freezer-refrigerator for 1 hour, then put into a plastic vessel, and kept in a −20° C. freezer for 2 months.

The strawberries, after defrosting, retained their shape and bright red color, and were fully edible raw. (An evaluation made by all 5 panelists.)

EXAMPLE 10

600 g of Housui brand pears were peeled, cored out and cut into 1.5–2.0 cm cubes, then soaked in 4 liters of a 6% by weight saline and 1.2% by weight citric acid solution kept between 55.5–58.5° C. for 12 minutes. After that, the pears were left as they were on a wire gauze for 3 minutes to drain solution, put into an earthen pot adding 360 g of refined white sugar, and cooked for 30 minutes over low heat while removing the scum to make jam.

The evaluation reveals that the products of the present invention had the following characteristics as compared with the non-treated ones.
① shorter cooking time (60 minutes required for the non-treated ones), ② the flavor of pears greatly retained, ③ light color and nearly transparent, ④ sour with well-balanced sweetness. (An evaluation made by all 5 panelists.)

EXAMPLE 11

300 g of carrots (peeled, cut into 3–4 cm cubes) were soaked in 4 liters of a 3% by weight saline solution kept between 55.5–58.5° C. for 20 minutes. After that the cubes were left as they were on a wire gauze for 5 minutes and drained, then boiled in water for 12 minutes. For comparison, non-treated carrots were boiled in water under the same conditions.

The evaluation of the products of the present invention shows that the following characteristics as compared to those of the non-treated carrots were seen.
① deep in color, ② moderately chewy, ③ not much falling apart while boiling, ④ the peculiar flavor and taste of carrots being strong. (An evaluation made by all 5 panelists)

EXAMPLE 12

500 g of 3 Beniazuma brand sweet potatoes (the most popular sweet potato in Japan, 30–35 mm in diameter×20 cm long) were soaked in 4 liters of a 3% by weight saline solution kept between 56–59° C. for 20 minutes. After that the sweet potatoes were left as they were at room temperature for one hour to return to an ambient temperature (Sample 4). The sweet potatoes (Sample 4) were heated in a 500-watt microwave oven for 10 minutes to make fukashi-imo (steamed sweet potatoes). For comparison, non-treated sweet potatoes were heated in a microwave oven in the same way.

Compared with the non-treated ones, the products of the present invention had the following characteristics:
① Dry inside and not soggy at all, ② very sweet, ③ strong flavor that sweet potatoes inherently retain.

Regarding the storage of Sample 4 (the present invention), the following finding was obtained:
① No low-temperature damage when stored at 5° C., ② No quality deterioration when kept at −20° C. in a freezer.

EXAMPLE 13

34 liters of a 7% by weight saline solution was put into a warm saline solution tank of the New-Texture Vegetable Processing Equipment (#100, manufactured by Terada Sei-sakusho Co., Ltd., Shizuoka Prefecture) and the temperature was kept between 55.5–58.5° C. While, 33 liters of a 0.7% by weight saline solution was put into a cold saline solution tank of the above equipment and the temperature was kept between 9–11° C.

3 kg of onions sliced lengthwise at 1–2 mm wide were placed in a basket, soaked in a warm saline solution tank for 2 minutes, transferred and soaked in a cold saline solution tank for 2 minutes, then left as it were to drain for 3 minutes, and finally evaluated.

The characteristics of the products of the present invention were as follows:
① The number of living bacteria* $4.4 \times 10^3$/g Coliform group** negative In the case of the non-treated sliced onions, however, the results were:

The number of living bacteria* $1.2 \times 10^5$/g

Coliform group** 16/g
*Petrifilm™—AC culture medium
**Petrifilm™—CC culture medium
② Moist, sharp taste remained and also very sweet.
③ most suitable for marinade material

What is claimed is:

1. A food processing method for edible and perishable plants comprising the steps of:

preparing an aqueous solution with a higher osmotic pressure than that of said plants to be processed;

heating said aqueous solution to a temperature in the range of 55° C. to 60° C., which is high enough to kill cells of said plants and microorganisms attached thereto;

bringing said solution into contact with said plants while keeping said temperature range for a time period required to kill substantial amount of said cells and substantially all of said microorganisms and cause enzymatic resolution by autolytic enzymes of said plants; and bringing said plants into contact with a cooling solution in succession to said contact with said aqueous solution for a time period which is equal to 50–100% of said heating time, said cooling solution having an osmotic pressure of 5 atm or higher and a temperature of 15° C. or lower.

2. A food processing method for plants as set forth in claim 1, wherein said aqueous solution has an osmotic pressure of 10 atm or higher.

3. A food processing method for plants as set forth in claim 1 or 2, wherein said plants are brought into contact with said aqueous solution and/or said cooling solution by soaking said plants in said aqueous solution and/or said cooling solution.

4. A food processing method for plants as set forth in any one of claim 1 or 2, wherein said plants are brought into contact with said aqueous solution and/or said cooling solution by spraying said aqueous solution and/or said cooling solution on said plants.

* * * * *